US006958405B2

(12) United States Patent
Le-Khac et al.

(10) Patent No.: US 6,958,405 B2
(45) Date of Patent: Oct. 25, 2005

(54) POLYMER-ENCAPSULATED TITANIUM ZEOLITES FOR OXIDATION REACTIONS

(75) Inventors: Bi Le-Khac, West Chester, PA (US); Roger A. Grey, West Chester, PA (US)

(73) Assignee: ARCO Chemical Technology, L.P., Greenville, DE (US)

( * ) Notice: Subject to any disclaimer, the term of this patent is extended or adjusted under 35 U.S.C. 154(b) by 42 days.

(21) Appl. No.: 10/796,842

(22) Filed: Mar. 9, 2004

(65) Prior Publication Data

US 2005/0203304 A1    Sep. 15, 2005

(51) Int. Cl.$^7$ .............................................. B01J 29/06
(52) U.S. Cl. ........................ 549/531; 549/263; 568/28; 568/716; 568/700; 564/253; 502/60; 502/64; 502/240; 502/242
(58) Field of Search ........................... 502/60, 64, 240, 502/242; 549/531, 263; 568/28, 716, 700; 564/253

(56) References Cited

U.S. PATENT DOCUMENTS

| | | | | |
|---|---|---|---|---|
| 4,410,501 | A | 10/1983 | Taramasso et al. | 423/326 |
| 6,037,487 | A | 3/2000 | Habeck et al. | 558/449 |
| 6,156,245 | A | 12/2000 | Takebayashi et al. | 264/4.7 |
| 6,194,591 | B1 | 2/2001 | Grey et al. | 549/533 |
| 6,399,794 | B1 * | 6/2002 | Hancu | 549/533 |
| 6,403,815 | B1 | 6/2002 | Grey | 549/532 |
| 6,534,661 | B1 * | 3/2003 | Zhou et al. | 549/531 |
| 2004/0053772 | A1 * | 3/2004 | Muller et al. | 502/60 |

FOREIGN PATENT DOCUMENTS

WO    WO 94/29378    * 12/1994

OTHER PUBLICATIONS

P. Kumar et al., *Synlett.*.(1995) 289.
S. Kobayashi et al., *Chem. Commun.* (2003) 449.
R. Akiyama et al., *Angew. Chem. Int. Ed.* 40 (2001) 3469.
S. Kobayashi et al., *J. Am. Chem. Soc.* 120 (1998) 2985.
K. Edler et al., *J. Chem. Soc. Chem. Commun.* (1995) 155.
M. Donbrow, "Microcapsules and Nanoparticles in Medicine and Pharmacy," Ed., pp 1-14, no date.
G. Beestman, "Microencapsulation of Solid Particles," in *Controlled-Release Delivery Systems for Pesticides* (1999), H. Scher, Ed., pp 31-54.
M. Iso et al. *Zairo Gijutsu* 3 (1985) 29.
M. Yoshida et al., *J. Appl. Polym. Sci.* 89 (2003) 1966.
S. Ley et al., *Chem. Commun.* (2002) 1132 and 1134.
J. Yu et al., *Chem. Commun.* (2003) 678.
H. Kage et al., *Adv. Powder Technol.* 13 (2002) 265.
Y. Hu et al., *Chem. Commun.* (2002) 788.
W. Chen et al., *Tetrahedron* 58 (2002) 3889.
D. Bergbreiter et al., *Org. Letters* 2 (2000) 393.
O. Chiantore et al., *Polym. Degrad. Stab.* 67 (2000) 461.
W. Chen et al., *Chem. Commun.* (2000) 839.
L. Balducci et al., *Angew. Chem. Int. Ed.,* 42 (2003) 4937.
T. Tatsumi et al.,*J. Chem. Soc. Chem. Commun.* (1992) 1446.
C. Perego et al., *Appl. Catal. A.* 221 (2001) 63.
P. Ingallina et al., *Sci. Tech. Catal.* (1994) 31.
H. Ichihashi et al., *Appl. Catal. A.* 221 (2001), 359.
A. Bhaumik et al., *Catal. Letters.* 40 (1996) 47.

* cited by examiner

*Primary Examiner*—Christina Johnson
(74) *Attorney, Agent, or Firm*—Jonathan L. Schuchardt

(57) ABSTRACT

Catalysts useful for oxidation reactions are disclosed. The catalysts comprise a polymer-encapsulated titanium zeolite. The catalysts are easy to prepare and use, they are easy to recover and reuse, and they provide good conversions in a variety of important oxidation processes. The invention includes a process which comprises oxidizing an organic compound in the presence of hydrogen peroxide and a polymer-encapsulated titanium zeolite. In one example, the organic compound is propylene and the reaction product is propylene oxide.

18 Claims, No Drawings

POLYMER-ENCAPSULATED TITANIUM ZEOLITES FOR OXIDATION REACTIONS

FIELD OF THE INVENTION

The invention relates to catalysts useful for a variety of industrially important oxidation reactions, including olefin epoxidation and alkane oxidation.

BACKGROUND OF THE INVENTION

Titanium zeolites, i.e., synthetic molecular sieves that incorporate titanium atoms in a silicate framework, catalyze a wide variety of valuable oxidative organic reactions. The versatility of titanium zeolites, particularly TS-1, for arene hydroxylation, alkane oxidation, olefin epoxidation, thioether oxidation, Baeyer-Villiger oxidation reactions, and other important transformations is well known. For a review, see P. Kumar et al., *Synlett.* (1995) 289. Despite their obvious value for oxidation chemistry, titanium zeolites have apparently not been encapsulated within a polymer prior to their use to catalyze oxidation reactions.

Recently, Professor Shū Kobayashi reviewed a new kind of catalyst based on a technique called "microencapsulation" (see *Chem. Commun.* (2003) 449 and references cited therein; *Angew. Chem., Int. Ed.* 40 (2001) 3469; *J. Am. Chem. Soc.* 120 (1998) 2985). While polymer encapsulation has been used for years by the pharmaceutical industry to mask taste, impart storage stability, reduce stomach irritation, target delivery, or control release of drugs, benefits of the technique for catalysis are just now being realized. Kobayashi demonstrated that highly efficient catalysts can be made if the metals are enveloped within a thin polystyrene film. Microencapsulated transition metal catalysts and ways to make them are described in the *Chem. Commun.* article referenced above. These have been used for etherification, olefin dihydroxylation, allylic substitution, Suzuki coupling, and other organic transformations. In sum, the value of microencapsulating transition metals for many organic reactions has been demonstrated, but polymer-encapsulated titanium zeolites have apparently not been made or used in catalysis.

SUMMARY OF THE INVENTION

The invention is a catalyst useful for oxidation reactions. The catalyst comprises a polymer-encapsulated titanium zeolite. The zeolite particles are encapsulated completely within a thin layer of polymer. The catalysts are easy to prepare and use, they are easy to recover and reuse, and they provide good conversions in a variety of important oxidation processes. Thus, the invention includes a process which comprises oxidizing an organic compound in the presence of hydrogen peroxide and a polymer-encapsulated titanium zeolite. In one example, the organic compound is propylene and the reaction product is propylene oxide.

DETAILED DESCRIPTION OF THE INVENTION

Catalysts of the invention include a titanium zeolite. Titanium zeolites are well-characterized, crystalline synthetic silicates or aluminosilicates that incorporate titanium atoms in the framework. The choice of titanium zeolite used depends upon many factors, particularly the type of organic reaction that it will catalyze and the identity of the reactants. In olefin epoxidations, for example, the choice of zeolite depends on the size and shape of the olefin to be epoxidized. It is preferred to use a relatively small pore titanium zeolite such as titanium silicalite if the olefin is a lower olefin such as ethylene, propylene, or 1-butene. When the olefin is propylene, TS-1 is particularly preferred. For a bulky olefin such as cyclohexene, a larger pore titanium zeolite such as a titanium zeolite having a structure isomorphous with zeolite beta is preferred.

Particularly preferred titanium zeolites include the class of molecular sieves commonly called titanium silicalites, particularly TS-1 (which has a topology similar to ZSM-5), TS-2 (which has a topology similar to ZSM-11), and TS-3. Also suitable are titanium zeolites that have framework structures isomorphous to zeolite beta, mordenite, ZSM-48, ZSM-12, and MCM-41. Preferred titanium zeolites contain no elements other than titanium, silicon, and oxygen in the lattice framework, although minor amounts of boron, iron, aluminum, or the like may be present. Titanium silicalites, such as TS-1, are most preferred. TS-1 can be made by any known method. See, e.g., U.S. Pat. No. 4,410,501, the teachings of which are incorporated herein by reference, and *J. Chem. Soc., Chem. Commun.* (1995)155.

The titanium zeolites are polymer-encapsulated. By "encapsulated," we mean that the zeolite particles are contained within and are surrounded by a thin layer of polymer. Thus, encapsulation involves entrapping the zeolite particle within a polymeric coating. To interact with the titanium atoms, reactants must penetrate the polymer coating.

Polymers suitable for use in making polymer-encapsulated titanium zeolites are homopolymers or random and block copolymers produced by free-radical, ionic, or coordination polymerization of one or more polymerizable monomers. Generally, the polymers are natural or synthetic polymers made by addition or condensation polymerizations. Examples include polystyrenics, polyolefins, polyureas, polyacrylics, polyurethanes, polyesters, polyamides, fluorinated polymers, polysaccharides, polypeptides, polynucleotides, and the like, and mixtures thereof. Particularly preferred are polystyrenics, polyolefins, polyacrylics, and polyureas. The polymers can be generated by bulk, solution, suspension, or emulsion polymerization methods. The polymers can be hydrocarbons, or they can incorporate functional groups such as hydroxyl, amine, phosphine, phosphine oxide, arsine, sulfur, sulfur oxides, fluoroalkyl, alkoxy, silane, siloxy, carboxy, or the like.

There are many suitable ways to encapsulate titanium zeolites within a polymer. Some of these techniques have been used to encapsulate pharmaceuticals to mask taste, impart storage stability, or target drug delivery; others have been used to encapsulate solid pesticide particles. Suitable techniques include, for example, spray-drying, spray-chilling, spray-coating, phase separation and coaservation, injection treatment coating, fluid bed coating, dry-on-dry coating, melt extrusion, vapor deposition, in-situ polymerization, including in-situ interfacial polymerization, and the like. These and other microencapsulation techniques are described in the introductory chapter of *Microcapsules and Nanoparticles in Medicine and Pharmacy*, M. Donbrow, Ed., pp. 1–14, and references cited therein, and in G. Beestman, "Microencapsulation of Solid Particles," *Controlled-Release Delivery Systems for Pesticides* (1999), H. Scher, Ed., pp. 31–54. See also U.S. Pat. No. 6,156,245.

Polymer encapsulation by phase separation/coascervation is one preferred technique. A suitable approach is illustrated by Kobayashi et al. (see *Chem. Commun.* (2003) 449 and references cited therein; *Angew. Chem., Int. Ed.* 40 (2001) 3469; *J. Am. Chem. Soc.* 120 (1998) 2985) with polystyrene as the polymer encapsulant. See also *Zairo Gijutsu* 3 (1985) 29, and *J. Appl. Polym. Sci.* 89 (2003) 1966.

In a particularly convenient coascervation approach, a modified version of the method of Kobayashi, polystyrene is dissolved in warm cyclohexane. Titanium zeolite is suspended in the mixture. Upon slow cooling to 0° C., phase separation and capsule formation occur. Hexane is added to harden the microcapsules, which are then isolated, washed, and dried.

In-situ polymerization is another preferred technique. The titanium zeolite is suspended in a reaction medium containing monomer(s), an initiator, and other components, and polymerization proceeds to give the polymer-encapsulated titanium zeolite. The monomers can be hydrophilic (e.g., N,N-dimethylacrylamide), hydrophobic (e.g., styrene), or a combination of these. Suitable techniques include bulk, emulsion, suspension, and interfacial polymerizations.

One interfacial method is illustrated by Ley et al. (see *Chem. Commun.* (2002) 1132 and 1134; and *Chem. Commun.* (2003) 678) in the preparation of polyurea-encapsulated transition metals. In this example, an organic phase containing polymerizable monomers and the transition metal source is dispersed within an aqueous phase that contains emulsifiers and/or stabilizers. Polymerization occurs at the interface to form microcapsule walls. For another example of in-situ polymerization to generate microcapsules, see Adv. Powder Technol. 13 (2002) 265.

In another in-situ polymerization example, styrene or a mixture of styrene and other ethylenic monomer(s) is polymerized in an aqueous suspension according to well-known techniques in the presence of a suspended titanium zeolite. The resulting polymer beads incorporate encapsulated titanium zeolite and are suitable for use as an oxidation catalyst according to the process of the invention.

In another preferred approach, the polymer incorporates recurring units of a fluorinated monomer. Particularly suitable are fluorinated monomers made by reacting fluorinated alcohols with acrylic ester precursors. These and other suitable fluorinated monomers have been described previously (see *Chem. Commun.* (2002) 788; *Tetrahedron* 58 (2002) 3889, *Org. Letters* 2 (2000) 393, *Polym. Degrad. Stab.* 67 (2000) 461; and *Chem. Commun.* (2000) 839.) For example, polymerization of trifluoroethylmethacrylate (from methacryloyl chloride and trifluoroethanol) with styrene gives a flurorinated copolymer. Polymer encapsulation can be effected either in-situ or later by phase separation/coascervation.

Polymer-encapsulated titanium zeolites are valuable for catalyzing a wide variety of organic reactions, particularly oxidation reactions. Thus, the invention includes a process comprising oxidizing an organic compound in the presence of hydrogen peroxide and a polymer-encapsulated titanium zeolite. Suitable oxidation processes include arene hydroxylation to phenols or phenol hydroxylation to catechols (see, e.g., *Angew. Chem., Int. Ed.*, 42 (2003) 4937; *J. Chem. Soc., Chem. Commun.* (1992) 1446; and *Appl. Catal. A* 221 (2001) 63), alkane oxidation to oxygenated products such as alcohols and ketones (*Sci. Tech. Catal.* (1994) 31), olefin epoxidation (*Appl. Catal. A* 221 (2001) 63; *Sci. Tech. Catal.* (1994) 31), thioether oxidation (*Synlett.* (1995) 289), cyclohexanone ammoximation (*Appl. Catal. A* 221 (2001) 63, 359), Baeyer-Villiger oxidation reactions (*Catal. Letters* 40 (1996) 47), and other important transformations. For a general review, see *Synlett.* (1995) 289.

Optionally, the oxidation processes are performed in the presence of a solvent. The choice of solvent will depend on many factors, including the type of oxidation process, the solubilities of the reactants and products, the reaction conditions, the type of equipment, and other factors. Suitable solvents include, for example, water, alcohols, water/alcohol mixtures, oxygenated hydrocarbons (esters, ketones, ethers, or the like), aliphatic and aromatic hydrocarbons, liquid or supercritical carbon dioxide, amides, sulfoxides, and the like, and mixtures thereof. Preferred solvents are water, alcohols, carbon dioxide, and mixtures thereof.

In one preferred oxidation process, the organic compound is an olefin and the oxidation product is an epoxide. In a particularly preferred process, the olefin is propylene and the epoxide is propylene oxide. Suitable procedures and reaction conditions for making propylene oxide from propylene with titanium zeolites and hydrogen peroxide have been described previously; see, e.g., U.S. Pat. Nos. 6,037,484 and 6,194,591, the teachings of which are incorporated herein by reference. If desired, the hydrogen peroxide can be generated in-situ from gaseous hydrogen and oxygen (see, e.g., U.S. Pat. No. 6,403,815). Surprisingly, polymer-encapsulation of the titanium zeolite does not interfere with the catalyst's ability to selectively produce propylene oxide with a minimal proportion of ring-opening products such as propylene glycol and propylene glycol ethers (see Examples 1–5, Comparative Example 6, and Table 1, below).

In another preferred oxidation process, the organic compound is a thioether and the oxidation product is a sulfoxide, sulfone, or mixture thereof. Oxidation of thioethers is valuable for converting sulfide-containing impurities in fuel streams to more polar species that are more easily removed from the fuel. Example 7, below, illustrates the process.

Alkane oxidation to alcohols, ketones, or other oxygenated products is another preferred oxidation process of the invention. The process is valuable because the oxygenated products are usually expensive compared with unfunctionalized hydrocarbons. Example 8 shows how pentane can be oxidized in the presence of a polymer-encapsulated titanium zeolite to give a mixture of C5 ketones and alcohols.

Other organic compounds can also be oxidized effectively using hydrogen peroxide and a polymer-encapsulated titanium zeolite of the invention. Thus, the invention includes oxidations of arenes to phenols, phenols to catechols, ketones to esters or lactones, ammoximation of aldehydes or ketones in the presence of ammonia or an amine to make oximes (e.g., the conversion of cyclohexanone to cyclohexanone oxime), and other oxidations known to be catalyzed by titanium silicalites (see *Synlett.* (1995) 289).

Polymer encapsulation of titanium zeolites provides numerous advantages. First, polymer encapsulation makes it easy to recover the titanium zeolites. When used in powder form, titanium zeolites can blind filters or migrate undesirably in a reaction system. While this is remedied by converting the titanium zeolite to a pellet or by spray drying it to increase particle size, such techniques are costly. Polymer encapsulation makes the titanium zeolite easy to recover by ordinary filtration methods (see Example 9, Comparative Example 10, and Table 2, below). Moreover, recovered polymer-encapsulated titanium zeolites can often be used without further processing.

For olefin epoxidations with hydrogen peroxide, we found that using a polymer-encapsulated titanium zeolite provides good selectivity to propylene oxide with minimal formation of propylene glycol and propylene glycol ethers. Polymer encapsulation does not appear to interfere with the titanium zeolite's ability to make epoxide selectively (see Table 1).

In sum, polymer-encapsulated titanium zeolites are easy to prepare and use, they are easy to recover and reuse, and they provide good results in a variety of oxidation processes that are normally catalyzed by titanium zeolites.

The following examples merely illustrate the invention. Those skilled in the art will recognize many variations that are within the spirit of the invention and scope of the claims.

EXAMPLE A

Preparation of Polystyrene-Encapsulated TS-1

Polystyrene (3.0 g, Aldrich) is dissolved in cyclohexane (60 g) at room temperature using an ultrasonic bath. TS-1 (3.0 g, prepared as described in Comparative Example C) is added and the resulting suspension is stirred for 2 h at 40° C. Heating is discontinued, and the mixture cools slowly to room temperature. As soon as the mixture becomes cloudy, hexanes (100 g) are added to further precipitate the polymer-encapsulated TS-1. The mixture is homogenized using an Omni International S/N GLH-4040 homogenizer (150 volt, 60 Hz) at about 50% power to break the solids into small particles. The solids are filtered and then washed with methanol (75 g) using the homogenizer as a mixer. The mixture is filtered, and the polystyrene-encapsulated TS-1 is dried under vacuum at 50° C. Yield: 5.34 g.

EXAMPLE B

Preparation of Poly(t-butylstyrene)-Encapsulated TS-1

Poly(tert-butylstyrene) (Aldrich; 3.0 g, $M_n$=50–100 K) is dissolved in tetrahydrofuran (20 g) at room temperature. TS-1 (3 g, prepared as described in Comparative Example C) is added and the resulting suspension is stirred for 1 h at 40° C. The THF is slowly evaporated at 40° C. to produce polymer-encapsulated TS-1. The solid is dried under vacuum at 60° C. and then ground to a fine powder. Yield: 5.42 g.

COMPARATIVE EXAMPLE C

A sample of TS-1 obtained from Chemical National Labs of India, a powder of about 0.2 to 0.3 microns, is calcined in air at 550° C. to remove the template. It contains 2.2 wt. % Ti.

EXAMPLE D

Preparation of Polystyrene-Encapsulated TS-1

Polystyrene (5.0 g, Aldrich) is dissolved in cyclohexane (100 g) at room temperature using an ultrasonic bath. TS-1 (5.0 g, prepared as described in Comparative Example C) is added and the resulting suspension is stirred for 2 h at 40° C. Heating is discontinued, and the mixture is chilled. Cold hexanes (50 g) are added to further precipitate the polymer-encapsulated TS-1. The mixture is decanted. More cold hexanes are added (100 g), and the mixture is homogenized. The mixture is again decanted, and methanol (100 g) is added. The mixture is again homogenized and filtered. The solids are recovered and dried under vacuum at 50° C. Yield: 9.61 g.

EXAMPLE E

Preparation of Fluoropolymer-Encapsulated TS-1

Styrene (40 g, 0.38 mol) and 2,2,2-trifluoroethyl methacrylate (10 g, 0.059 mol) are dissolved in tetrahydrofuran (75 g) in a glass reactor. 2,2'-Azobisisobutyronitrile (AIBN, 0.5 g) in tetrahydrofuran (2 g) is added, and the stirred mixture is heated to 80° C. for about 6 h. The reactor is cooled and the contents are removed. The polymer is recovered by precipitation in methanol. Copolymer yield: 27.7 g. Tg=91.5° C.

A sample of the fluoropolymer (5.0 g) is dissolved in cyclohexane (100 g) and warmed to 40° C. TS-1 (5.0 g, prepared as described in Comparative Example C) is added and the resulting suspension is stirred for 2 h at 40° C. Heating is discontinued, and the mixture is chilled overnight. Cold hexanes (50 g) are added to further precipitate the polymer-encapsulated TS-1. The mixture is decanted. Cold hexanes (100 g) are mixed with the solids, and the mixture is decanted. More cold hexanes (100 g) are added, and the mixture is homogenized. The mixture is again decanted, and the solids are recovered, dried under vacuum at 50° C., and ground to a fine powder. Yield: 7.95 g.

EXAMPLE F

Preparation of Terpolymer-Encapsulated TS-1

4-t-Butylstyrene (42 g, 0.26 mol), p-styryldiphenylphosphine (21 g, 0.073 mol), and N,N-dimethylacrylamide (7.0 g, 0.071 mol) are dissolved in tetrahydrofuran (89 g) in a glass reactor. 2,2'-Azobisisobutyronitrile (AIBN, 0.5 g) is added, and the stirred mixture is heated to 70–80° C. for about 5 h. The reactor is cooled and the contents are removed. Removal of volatiles provides a solid terpolymer. Yield: 39.8 g. Tg=123.5° C.; Mn=20,000; Mw/Mn=1.75; P: 3.4 wt. %; N, 0.88 wt. %.

A sample of the terpolymer (5.0 g) is dissolved in cyclohexane (100 g) and warmed to 40° C. TS-1 (5.0 g, prepared as described in Comparative Example C) is added and the resulting suspension is stirred for 2 h at 40° C. Heating is discontinued, and the mixture is chilled overnight. Cold hexanes (50 g) are added to further precipitate the polymer-encapsulated TS-1. The mixture is decanted. More cold hexanes are added (80 g), and the mixture is shaken and decanted. The solids are recovered and dried under vacuum at 50° C. Yield: 7.19 g.

OXIDATION EXAMPLES

Example 1

Propylene Epoxidation using Polystyrene-Encapsulated TS-1

A 100-mL Parr reactor is charged with a 70:25:5 wt. % solution of methanol/water/hydrogen peroxide (40 g) and polystyrene-encapsulated TS-1 (50 wt. % TS-1, 300 mg) as prepared in Example A. The reactor is sealed and charged with propylene (18 g). The magnetically stirred reaction mixture is heated at 50° C. for 30 min., and is then cooled to 10° C. The liquid and gas phases are analyzed by gas chromatography. Results appear in Table 1.

Example 2

Propylene Epoxidation using Poly(t-butylstyrene)-Encapsulated TS-1

The procedure of Example 1 is followed except that the catalyst is a poly(t-butylstyrene)-encapsulated TS-1 (50 wt. % TS-1, 300 mg) as prepared in Example B. Results appear in Table 1.

Example 3

Propylene Epoxidation using Polystyrene-Encapsulated TS-1

A 150-mL Parr reactor is charged with a 70:25:5 wt. % solution of methanol/water/hydrogen peroxide (40 g) and polystyrene-encapsulated TS-1 (50 wt. % TS-1, 300 mg) as prepared in Example D. The reactor is sealed and charged with propylene (23 to 25 g, weighed to 3 significant figures). The magnetically stirred reaction mixture is heated at 50° C. for 30 min. at a reactor pressure of about 280 psig, and is then cooled to 10° C. The liquid and gas phases are analyzed by gas chromatography. Results appear in Table 1.

Example 4

Propylene Epoxidation using Fluoropolymer-Encapsulated TS-1

The procedure of Example 3 is followed, except that the fluoropolymer-encapsulated TS-1 prepared in Example E (300 mg) is used. Results appear in Table 1.

Example 5

Propylene Epoxidation using Terpolymer-Encapsulated TS-1

The procedure of Example 3 is followed, except that the terpolymer-encapsulated TS-1 prepared in Example F (300 mg) is used. Results appear in Table 1.

Comparative Example 6

Propylene Epoxidation using TS-1

The procedure of Example 1 is followed except that the catalyst is TS-1 that is not polymer-encapsulated as prepared in Comparative Example C, and only 150 mg of catalyst is used. Results appear in Table 1.

TABLE 1

Propylene Epoxidations

| Ex # | Catalyst | $H_2O_2$ % conversion | PO mmol | PO/POE (%) |
|---|---|---|---|---|
| 1 | A | 66 | 36 | 93 |
| 2 | B | 66 | 35 | 93 |
| 3 | D | 72 | 41 | 93 |
| 4 | E | 73 | 42 | 92 |
| 5 | F | 89 | 44 | 89 |
| C6 | C | 72 | 37 | 91 |

The results in Table 1 demonstrate that polymer-encapsulation of the titanium zeolite does not interfere with the catalyst's ability to selectively produce propylene oxide with a minimal proportion of propylene glycol and propylene glycol ethers. On the other hand, polymer-encapsulated catalysts are much more easily recovered from the reaction mixture compared with TS-1 powder (see Table 2).

Example 7

Thiophene Oxidation using Polystyrene-Encapsulated TS-1

A 100-mL Parr reactor is charged with polystyrene-encapsulated TS-1 (50 wt. % TS-1, 50 mg) as prepared in Example A, 2-methyl-thiophene (41 mg), methanol (18 g), deionized water (1.8 g), and hydrogen peroxide (0.23 g of 30% $H_2O_2$). The magnetically stirred reaction mixture is heated at 60° C. for 1 h. The liquid phase is analyzed by liquid chromatography. Conversion of 2-methylthiophene to oxidized products, including 2-methylthiophene oxide: 70%.

Example 8

Pentane Oxidation using Polystyrene-Encapsulated TS-1

A 100-mL Parr reactor is charged with polystyrene-encapsulated TS-1 (50 wt. % TS-1, 200 mg) as prepared in Example A, n-pentane (0.21 g), t-butyl alcohol (20 g), and hydrogen peroxide (0.55 g of 30% $H_2O_2$). The reactor is sealed, pressurized to 100 psig with nitrogen, and vented to 1 atm two times. The reactor is then pressurized to 500 psig with nitrogen, and the magnetically stirred reaction mixture is heated at 60° C. for 2 h. After cooling, the liquid phase is analyzed by GLC, which shows a 40% conversion of n-pentane to oxidized products, including 2-pentanone, 3-pentanone, 2-pentanol, and 3-pentanol.

Examples 7 and 8 demonstrate that polymer-encapsulated titanium zeolites have utility for a variety of oxidation reactions normally catalyzed by titanium zeolites.

Example 9 and Comparative Example 10

Filterability Comparison

The filterability of a polymer-encapsulated TS-1 catalyst is compared with TS-1 powder. Mixtures of Catalysts D and C in methanol/water (8:2 by volume, 50 mL) containing 1 wt. % of solids are prepared. The mixtures are filtered at 320 psig through a 2-μm filter, and the time needed to collect 20-mL and 40-mL samples is recorded. Results appear in Table 2.

The results demonstrate that TS-1 powder (Comparative Example 10) tends to plug the filter, resulting in a tedious filtration. Polymer encapsulation provides an easy, inexpensive way to make titanium zeolite oxidation catalysts that are easily recovered from the reaction mixture.

TABLE 2

Filterability of Polymer-Encapsulated Catalysts

| Ex. | Catalyst | Catalyst Source | Time to collect (min) 20-mL | 40-mL |
|---|---|---|---|---|
| 9 | PS-encap TS-1 | D | 2 | 5 |
| C10 | TS-1 powder | C | 11 | 33 |

The preceding examples are meant only as illustrations. The following claims define the invention.

We claim:

1. A catalyst comprising a polymer-encapsulated titanium zeolite.

2. The catalyst of claim 1 wherein the titanium zeolite is a titanium silicalite.

3. The catalyst of claim 2 wherein the titanium silicalite is TS-1.

4. The catalyst of claim 1 wherein the titanium zeolite is titanium beta.

5. The catalyst of claim 1 wherein the polymer is selected from the group consisting of polystyrenics, polyolefins, polyureas, polyacrylics, polyurethanes, polyesters, fluorinated polymers, polyamides, polysaccharides, polypeptides, polynucleotides, and mixtures thereof.

6. The catalyst of claim 5 wherein the polymer is polystyrene.

7. A process which comprises oxidizing an organic compound in the presence of hydrogen peroxide and the catalyst of claim 1.

8. The process of claim 7 wherein the organic compound is an olefin and the oxidation product is an epoxide.

9. The process of claim 8 wherein the olefin is propylene.

10. The process of claim 8 wherein the titanium zeolite is TS-1.

11. The process of claim 8 wherein the polymer is selected from the group consisting of polystyrenics, polyolefins, polyureas, polyacrylics, polyurethanes, polyesters, polyamides, fluorinated polymers, polysaccharides, polypeptides, polynucleotides, and mixtures thereof.

12. The process of claim 7 performed in the presence of a solvent selected from the group consisting of water, alcohols, carbon dioxide, and mixtures thereof.

13. The process of claim 7 wherein the organic compound is an arene and the oxidation product is a phenol.

14. The process of claim 7 wherein the organic compound is a phenol and the oxidation product is a catechol.

15. The process of claim 7 wherein the organic compound is a ketone and the oxidation product is an ester or a lactone.

16. The process of claim 7 wherein the organic compound is an aldehyde or a ketone, the process is performed in the presence of ammonia or an amine, and the oxidation product is an oxime.

17. The process of claim 7 wherein the organic compound is an alkane and the oxidation product is an alcohol, a ketone, or a mixture thereof.

18. The process of claim 7 wherein the organic compound is a thioether and the oxidation product is a sulfone, a sulfoxide, or a mixture thereof.

* * * * *